US006877092B2

(12) United States Patent
Chandersekaran et al.

(10) Patent No.: US 6,877,092 B2
(45) Date of Patent: Apr. 5, 2005

(54) APPARATUS, METHOD, AND COMPUTER PROGRAM PRODUCT FOR ACHIEVING INTEROPERABILITY BETWEEN CRYPTOGRAPHIC KEY RECOVERY ENABLED AND UNAWARE SYSTEMS

(75) Inventors: Sekar Chandersekaran, Potomac, MD (US); Sohail Malik, Gaithersburg, MD (US); Michael Muresan, Gaithersburg, MD (US); Narayanan Vasudevan, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/287,172

(22) Filed: Nov. 4, 2002

(65) Prior Publication Data

US 2003/0076960 A1 Apr. 24, 2003

Related U.S. Application Data

(63) Continuation of application No. 09/224,886, filed on Dec. 31, 1998, now abandoned.

(51) Int. Cl.[7] .............................. H04L 9/12; H04L 9/00
(52) U.S. Cl. ...................................... 713/151; 380/286
(58) Field of Search ................................ 713/151, 152, 713/153, 200, 201; 380/286; 709/224, 225, 223

(56) References Cited

U.S. PATENT DOCUMENTS

| 5,796,830 A | 8/1998 | Johnson et al. |
| 5,815,573 A | 9/1998 | Johnson et al. |
| 6,061,454 A | * 5/2000 | Malik et al. ................ 380/278 |

OTHER PUBLICATIONS

Al–Salqan,"Cryptographic Key Recovery", 1997, IEEE, pp. 34–37.*
Lee et al,"On the Key Recovery of the Key Escrow System", 1997 IEEE, pp216–220.*

* cited by examiner

*Primary Examiner*—Matthew Smithers
(74) *Attorney, Agent, or Firm*—Paul J. Otterstedt

(57) ABSTRACT

An apparatus, method, and computer program product for achieving interoperability between cryptographic key recovery enabled and unaware systems. The method includes the steps of encrypting data using a cryptography key to generate ciphertext; generating a key recovery block containing key recovery information for the ciphertext; determining whether a receiver for the ciphertext is key recovery unaware; and sending the key recovery block to a key recovery client when it is determined that the receiver is key recovery unaware. In a preferred embodiment, the ciphertext is sent to the receiver only after receiving confirmation from the key recovery client of the receipt of the key recovery block. Also in a preferred embodiment, the key recovery block is sent as part of an Internet Message Control Protocol (ICMP) message.

21 Claims, 4 Drawing Sheets

APPARATUS, METHOD, AND COMPUTER PROGRAM PRODUCT FOR ACHIEVING INTEROPERABILITY BETWEEN CRYPTOGRAPHIC KEY RECOVERY ENABLED AND UNAWARE SYSTEMS

CROSS REFERENCE TO RELATED APPLICATIONS

This application is a continuation of the U.S. application identified by Ser. No. 09/224,886, filed Dec. 31, 1998 now abandoned, the disclosure of which is incorporated by reference herein.

BACKGROUND OF THE INVENTION

1. Field of the Invention

This invention relates to a cryptographic key recovery system and, more particularly, to achieving interoperability between systems that are enabled for, and unaware of, cryptographic key recovery.

2. Description of the Related Art

Copending U.S. Patent Application filed herewith, Ser. No. 09/224,892, entitled "Apparatus, Method, And Computer Program Product For High-Availability Multi-Agent Cryptographic Key Recovery," filed Dec. 31, 1998 assigned to the International Business Machines Corporation, is incorporated herein by reference. This cited patent application describes a key recovery system using multiple key recovery agents.

Copending U.S. Patent Application of D. B. Johnson et al., Ser. No. 08/629,815, filed Apr. 10, 1996, entitled "Cryptographic Key Recovery System" ("Johnson et al. I"), assigned to the International Business Machines Corporation, is incorporated herein by reference. This cited patent application describes a key recovery system using multiple key recovery agents.

Copending U.S. Patent Application of D. B. Johnson et al., Ser. No. 08/681,629, filed Jul. 29, 1996, entitled "Interoperable Cryptographic Key Recovery System" ("Johnson et al. II"), assigned to the International Business Machines Corporation, is incorporated herein by reference. This cited patent application describes another key recovery system.

Copending U.S. Patent Application of S. Chandersekaran et al., Ser. No. 08/971,204, filed Nov. 14, 1997, entitled "Frame-Work Based Cryptographic Key Recovery System" ("Chandersekaran et al."), assigned to the International Business Machines Corporation, is incorporated herein by reference. This cited patent application describes a key recovery system.

U.S. Pat. No. 6,058,188, entitled Method and Apparatus for Interoperable Validation for Key Recovery Information in a Cryptographic System" (Chandersekaran et al.) assigned to the International Business Machine Corp. is incorporated herein by reference. This cited patent describes a key recovery system.

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies because the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (that is, systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving the key portions to the key recovery agents (in which case the key portions are said to be "escrowed") or by providing sufficient information in the communication itself (as by encrypting the key portions) to allow the key recovery agents to regenerate the key portions. Key recovery agents would reveal the escrowed or regenerated key portions to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent.

Key recovery systems serve the communicants' interest in privacy, since their encryption system retains its full strength against third parties and does not have to be weakened to comply with domestic restrictions on encryption or to meet export requirements. At the same time, key recovery systems serve the legitimate needs of law enforcement by permitting the interception of encrypted communications in circumstances where unencrypted communications have previously been intercepted (such as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

The term "key recovery" encompasses mechanisms that allow authorized third parties to retrieve the cryptographic keys used for data confidentiality, with the ultimate goal of recovery of encrypted data. There are two classes of key recovery mechanisms based on the ways keys are held to enable key recovery: key escrow and key encapsulation. Key escrow techniques are based on the paradigm that the government or a trusted third party called an "escrow agent," holds the actual user keys or portions thereof. Key encapsulation techniques, on the other hand, are based on the paradigm that a cryptographically encapsulated form of the key is made available to third parties that require key recovery; the encapsulation technique ensures that only certain trusted third parties called "recovery agents" can perform the unwrap operation to retrieve the key material buried inside. There may also be hybrid schemes that use some escrow mechanisms in addition to encapsulation mechanisms.

An orthogonal way to classify key recovery mechanisms is based on the nature of the key that is either escrowed or encapsulated. Some schemes rely on the escrow or encapsulation of long-term keys, such as private keys, while other schemes are based on the escrow or encapsulation of ephemeral keys such as session keys.

Since escrow schemes involve the actual archival of keys, they typically deal with long-term keys, in order to avoid the proliferation problem that arises when trying to archive myriad ephemeral keys. These long-term "escrowed" keys are then used to retrieve the ephemeral keys used for data confidentiality.

Key encapsulation techniques can also choose to archive the encapsulated keys, but usually they do not. Instead, these techniques usually operate on the ephemeral keys, and associate the encapsulated key with the actual enciphered message and thereby dispense with the archival process. The encapsulated key is put into a key recovery block that is generated by the party performing the data encryption, and associated with the encrypted data. To ensure the transmission and the integrity of the key recovery block, it may be required for processing by the party performing the data decryption. The processing mechanism ensures that successful data decryption cannot occur unless the key recovery block is processed successfully. Since the key recovery block has to be associated with the cryptographic session in some way, key encapsulation schemes may require the perturbation of the communication protocol used.

The process of cryptographic key recovery involves two major phases. First, parties that are involved in cryptographic associations have to perform an operation to enable key recovery (such as the escrow of use keys, or the generation of key recovery blocks, etc.)—this is typically called the "key recovery enablement" phase. Next, authorized third parties that desire to recover the data keys do so with the help of a recovery server and one or more escrow agents or recovery agents; this is the actual "key recovery service" phase.

As key recovery systems proliferate, they will be required to communicate with systems that do not employ key recovery. Such systems may not be able to process a key recovery block, or may even experience a protocol failure upon receipt of a key recovery block. For purposes of discussion, systems are grouped into three categories: key recovery aware, key recovery enabled, and key recovery unaware. A key recovery enabled system can generate a key recovery block, can decode a received key recovery block to verify its integrity, and can process a received key recovery block to obtain the information in the key recovery field of the block. A key recovery aware system can verify the integrity of a received key recovery block, but cannot process a received key recovery block to obtain the information in the key recovery field of the block. A key recovery unaware system is one that can not receive a key recovery block without experiencing failure.

In general, systems that are either key recovery aware or key recovery enabled exchange key recovery blocks at the application layer (for example, OSI layer 7). However, to achieve interoperability between these systems and key recovery unaware systems at the application layer, it would be necessary to modify the application layer protocol. This approach suffers from two distinct disadvantages. First, such a protocol modification would require large scale development and universal acceptance. Second, such modification would require approval by the cognizant standards organization. Neither of these scenarios is likely.

SUMMARY OF THE INVENTION

In order to avoid these difficulties, the present invention takes advantage of existing protocol features at lower levels of the communications protocol stack. In particular, the present invention uses Internet Control Message Protocol (ICMP) messages to exchange key recovery blocks. This approach has two distinct advantages. First, ICMP is mandatory within the TCP/IP protocol suite. Therefore, all machines using the TCP/IP protocol can exchange these messages. Second, the ICMP protocol requires the recipient of an ICMP message to deliver an acknowledgement to the sender of the message. So, the protocol includes a positive receipt acknowledgement. Further, ICMP operates at the network layer (for example, OSI layer 3) and requires no interaction with higher layers in the communications protocol suite. These characteristics make ICMP an ideal vehicle for transporting key recovery blocks and for confirming their delivery.

According to one aspect, the present invention provides a method for key recovery. The method includes the steps of encrypting data using a cryptography key to generate ciphertext; generating a key recovery block containing key recovery information for the ciphertext; determining whether a receiver for the ciphertext is key recovery unaware; and sending the key recovery block to a key recovery client when it is determined that the receiver is key recovery unaware. In a preferred embodiment, the ciphertext is sent to the receiver only after receiving confirmation from the key recovery client of the receipt of the key recovery block. Also in a preferred embodiment, the key recovery block is sent as part of an Internet Control Message Protocol (ICMP) message.

According to a further aspect of the present invention, the key recovery block is sent to the receiver as part of an ICMP message when the receiver is determined to be key recovery aware. ICMP is described in detail in a book entitled "Internetworking with TCP/IP, Volume 1, Principles, Protocols, and Architecture" by Douglas E. Comer, Prentice Hall, 1995.

Further features and advantages of the present invention, as well as the structure and operation of various embodiments of the present invention are described in detail below with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The preferred embodiment is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

Figure 1:
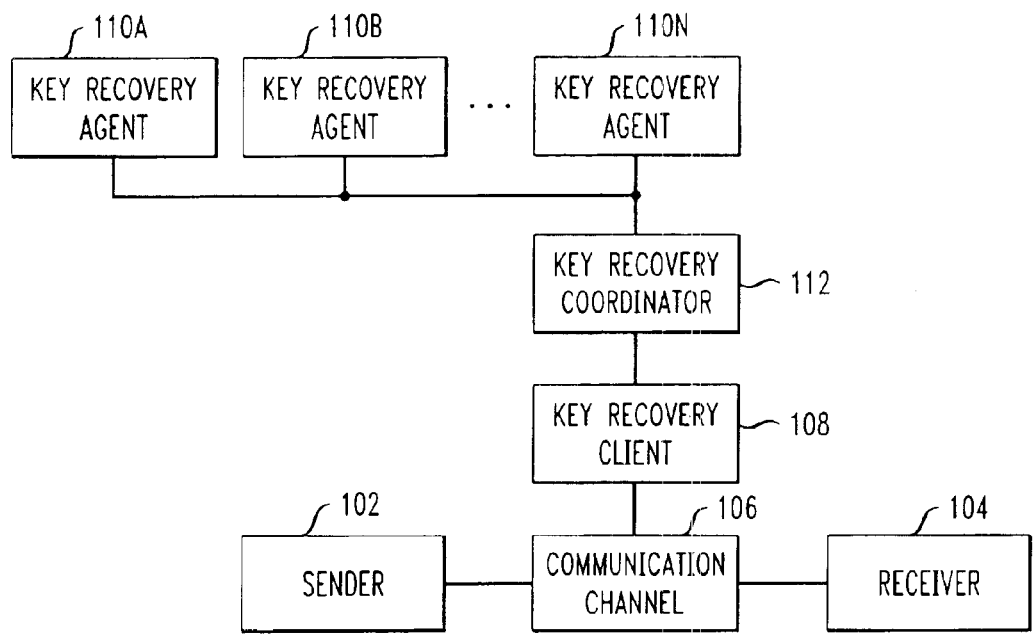
FIG. 1 depicts a key recovery system according to a preferred embodiment of the invention.

FIG. 1 depicts a key recovery system 100 according to a preferred embodiment of the present invention. In system 100, a sender 102 encrypts messages using a cryptographic key and generates a key recovery block. These are sent to receiver 104 using communication channel 106. If necessary, the cryptographic key can be sent by communication channel 106, or by any other means, as would be apparent to one skilled in the art. A key recovery client 108 monitors communication channel 106. In response to key recovery requests from key recovery client 108, a key recovery coordinator 112 provides key recovery service with the help of key recovery agents 110A–110N.

Figure 2:
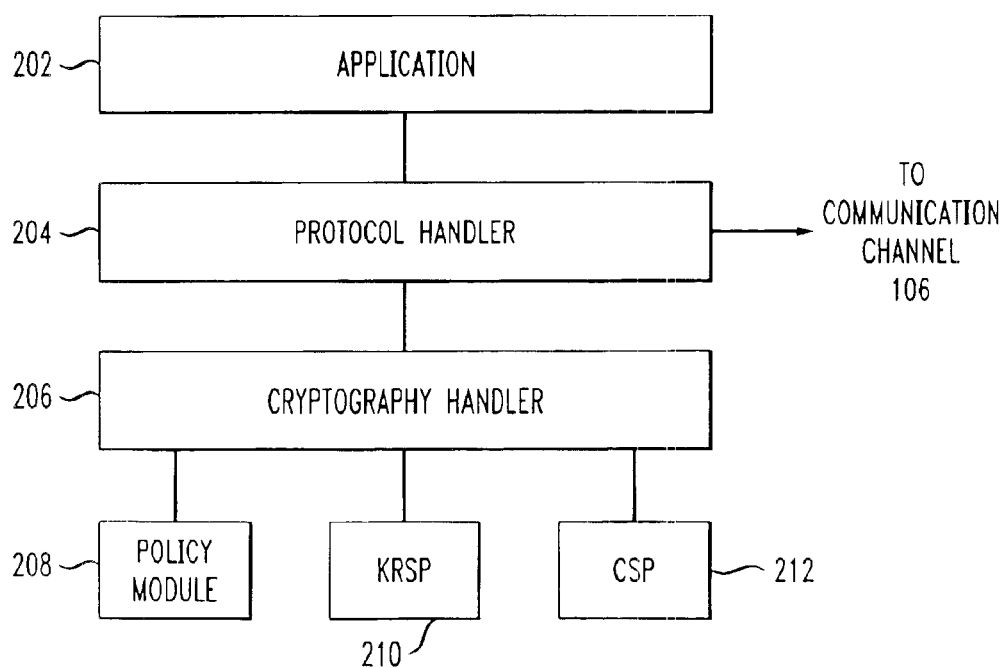
FIG. 2 depicts the architecture of a sender or receiver in a key recovery system according to a preferred embodiment of the present invention.

In a preferred embodiment, sender 102 and receiver 104 each employ a Frame-Work Based Cryptographic Key Recovery System such as that described in Chandersekaran et al. For convenience, such a system is now briefly described with reference to FIG. 2.

System 200 includes an application 202. Application 202 can be any application that requires communication services, such as an electronic mail program. Application 202 is coupled to a protocol handler 204. Protocol handler 204 provides communication services over communication channel 106 in response to commands and data passed from application 202. In the preferred embodiment, the communication protocol employed is TCP/IP.

Protocol handler 204 is coupled to a cryptography handler 206. Cryptography handler 206 fulfills requests from protocol handler 204 to generate cryptography keys, to encrypt plaintext using cryptography keys to create ciphertext, to decrypt ciphertext using cryptography keys to produce plaintext, and to provide key recovery services.

Cryptography handler 206 is coupled to a policy module 208. Policy module 208 contains rules regarding the handling of messages encrypted with, or to be encrypted using, strong cryptographic methods. These polices can be established by law enforcement agencies, enterprises, individuals, and the like. For example, one policy mandated by the United States is to provide any cryptographic systems destined for export with a suitable key recovery method to be employed whenever strong cryptography is used. Cryptography handler 206 consults policy module 208 whenever strong cryptography is requested by protocol handler 204. For example, in the system destined for export from the United States, any request for strong cryptography from protocol handler 204 will, in accordance with the rules in policy module 208, be provided with key recovery.

In a preferred embodiment, the key recovery and cryptography services are modularized. Therefore, these services need not be provided by the same entity that provided cryptography handler 206. This allows a purchaser of a cryptography system to purchase these three elements from different vendors if desired.

Cryptography handler 206 is coupled to key recovery service provider (KRSP) 210. In response to requests from cryptography handler 206, KRSP 210 generates key recovery blocks and provides other key recovery services as described below.

Cryptography handler 206 is also coupled to cryptography service provider (CSP) 212. In response to requests from cryptography handler 206, CSP 212 generates cryptographic keys and provides other cryptography services.

Figure 3:
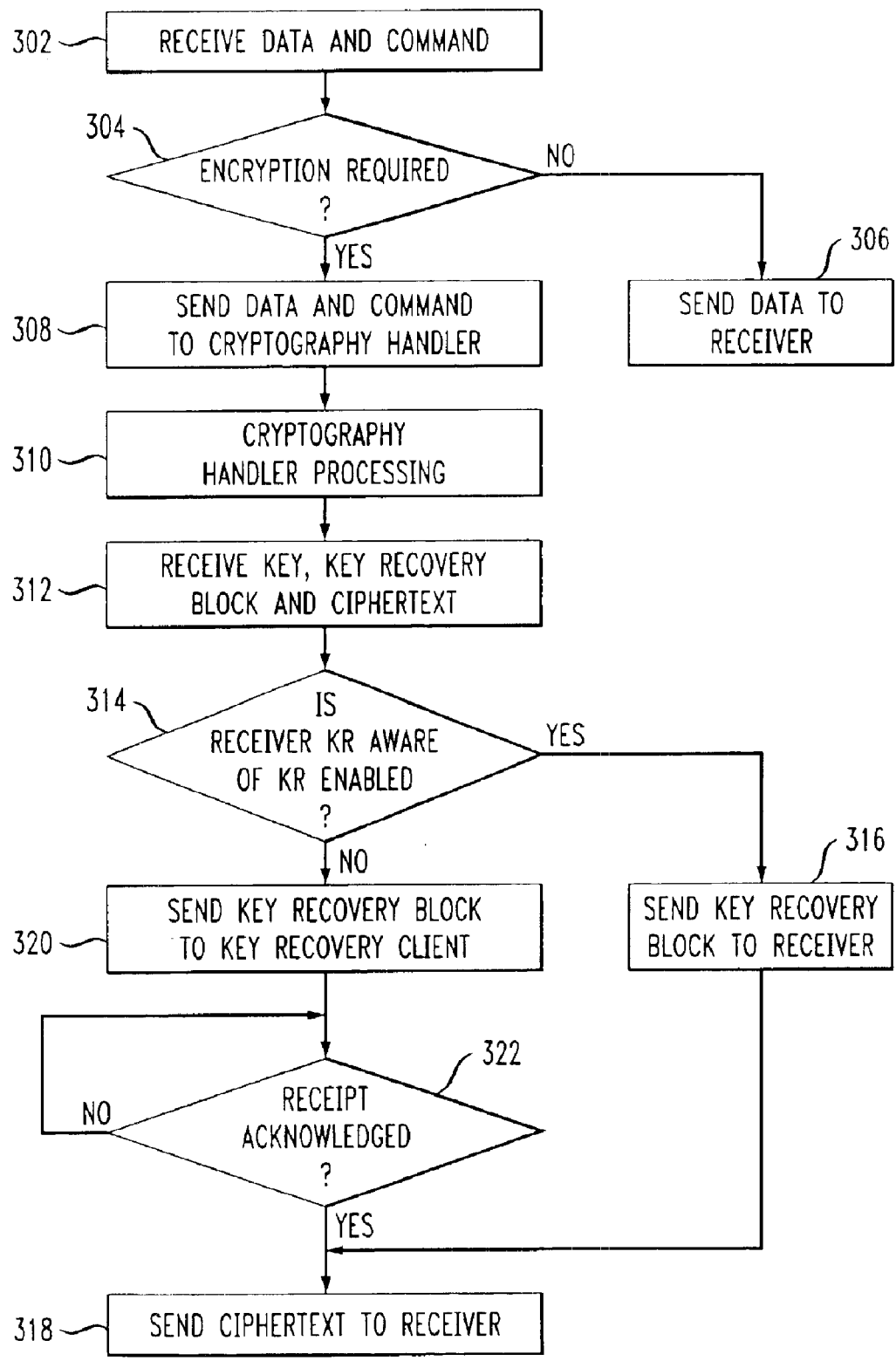
FIG. 3 is a flowchart depicting the operation of a protocol handler according to a preferred embodiment of the present invention.

FIG. 3 is a flowchart depicting the operation of protocol handler 204 according to a preferred embodiment of the present invention. When application 202 requires that data be sent over communication channel 106, it passes that data, along with suitable commands regarding transmission and the like, to protocol handler 204. For example, an email application may pass a message and a "send" command to protocol handler 204 for transmission to a receiver. Protocol handler 204 receives the data and command, as shown in step 302.

Protocol handler 204 checks the command to determine whether the data is to be encrypted, as shown in step 304. If not, protocol handler 204 sends the data to the receiver, as shown in step 306.

However, when encryption of the data is required, the data and a command to encrypt are sent to cryptography handler 206, as shown in step 308. In response, cryptography handler 206 generates a cryptography key and ciphertext encrypted with that key. In addition, if key recovery is required, cryptography handler 206 generates a key recovery block, as shown in step 310, and as described in detail with respect to FIG. 4 below. Protocol handler 204 receives the key, key recovery block, and ciphertext from cryptography handler 206, as shown in step 312.

Key recovery blocks are well-known in the relevant arts. A common key recovery block proposed by the Key Recovery Alliance has been published in a document entitled "A Common Key Recovery Block Format: Promoting Interoperability Between Dissimilar Key Recovery Mechanisms, Version 1.1" by Sarbari Gupta, dated May 28, 1988, and available at the Key Recovery Alliance website, www.kra.org.

Protocol handler 204 then determines whether receiver 104 is key recovery aware or key recovery enabled, as shown in step 314. In one embodiment, this is accomplished by referring to a look-up table that stores receivers and their key recovery awareness. The determination of step 314 can also be accomplished in other ways that are well-known in the relevant arts.

If receiver 104 is either key recovery aware or key recovery enabled, as indicated by the "yes" branch from step 314, then the key recover block is sent to receiver 104 over communication channel 106, as shown in step 316. In that case, key recovery client 108 can obtain the key recovery block by simply monitoring communication channel 106.

However, if receiver 104 is neither key recovery aware or key recovery enabled (that is, receiver 104 is key recovery unaware), as indicated by the "no" branch from step 314, then protocol handler 204 sends the key recovery block directly to key recovery client 108, as shown in step 320. In one embodiment, the key recovery block is sent as an application layer message. In another embodiment, the key recovery block is sent as part of an ICMP message. In either embodiment, the message can be sent over communication channel 106 or by other communication channels or methods well-known in the relevant arts.

In a preferred embodiment, protocol handler 204 cannot send the ciphertext to receiver 104 until it receives a delivery acknowledgment from key recovery client 108 confirming that the key recovery block was successfully delivered to key recovery client 108, as shown in step 322. This policy can be implemented within policy module 208. In an alternative embodiment, protocol handler 204 need not wait for the delivery acknowledgment before sending the ciphertext to receiver 104.

Protocol handler 204 then sends the ciphertext to receiver 104, as shown in step 318.

Figure 4:
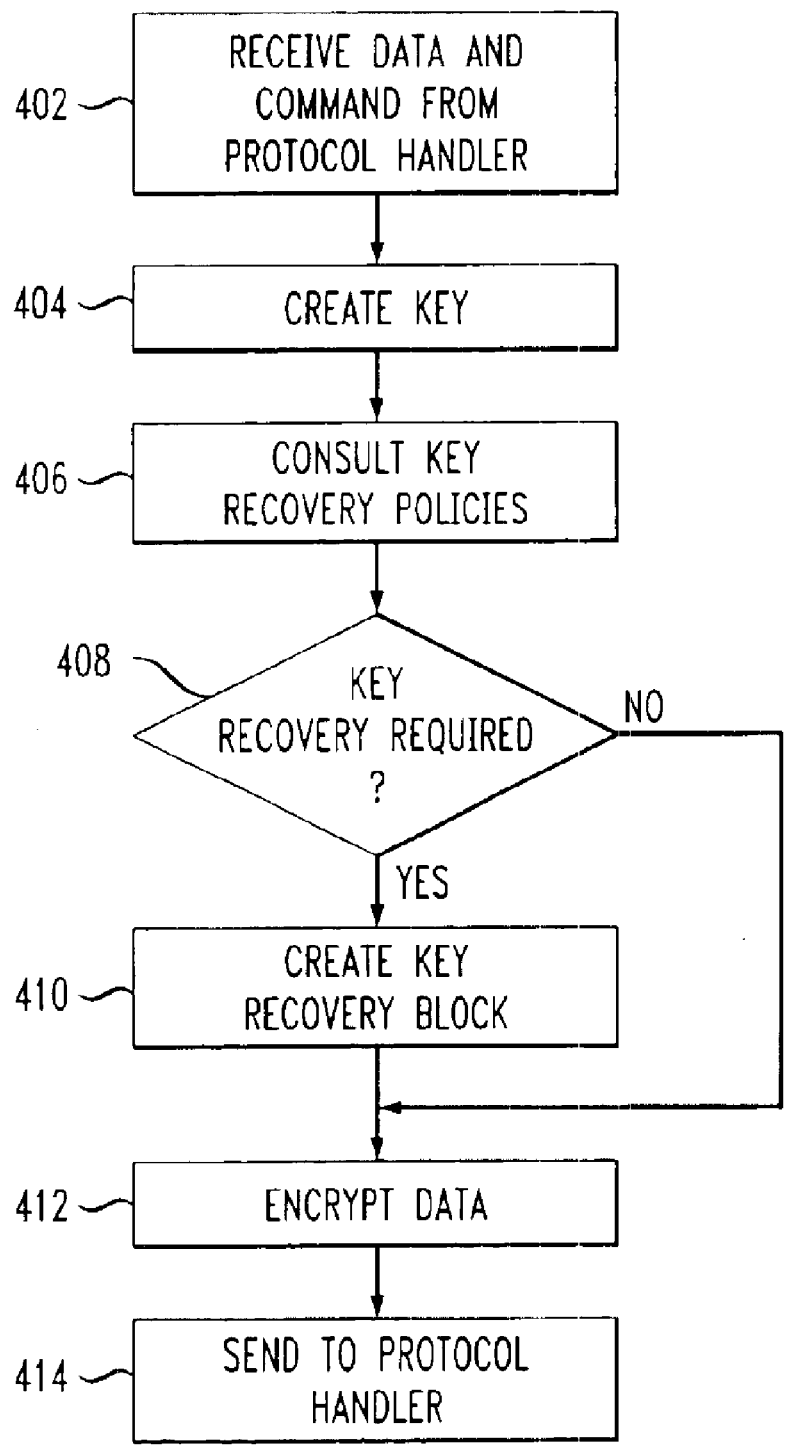
FIG. 4 is a flowchart depicting the operation of a cryptography handler according to a preferred embodiment of the present invention.

FIG. 4 is a flowchart depicting the operation of cryptography handler 206 according to a preferred embodiment of the present invention. This operation corresponds to step 310 in FIG. 3. Cryptography handler 206 receives data to be encrypted and a command specifying the encryption from protocol handler 204, as shown in step 402. Cryptography handler 204 then creates a cryptographic key, as shown in step 404. In a preferred embodiment, this accomplished by requesting a cryptography key from a cryptography service provider 212. Cryptography handler 204 also consults the key recovery policies embodied in policy module 208 to determine whether key recovery is required, as shown in step 406. If key recovery is not required, processing moves to step 412, as shown by the "no" arrow from step 408.

However, if key recovery services are required, as shown by the "yes" branch from step 408, then cryptography handler 206 creates a key recovery block, as shown in step 410. In a preferred embodiment, this is accomplished by requesting a key recovery block from a key recovery service provider 210.

Next, cryptography handler 206 uses the key created in step 404 to encrypt the data to produce ciphertext, as shown in step 412. Cryptography handler then sends the cryptography key, ciphertext, and if necessary, key recovery block, to protocol handler 204, as shown in step 414.

Thus, according to the present invention, key recovery can be implemented even when the receiver of the ciphertext is key recovery unaware.

Figure 5:
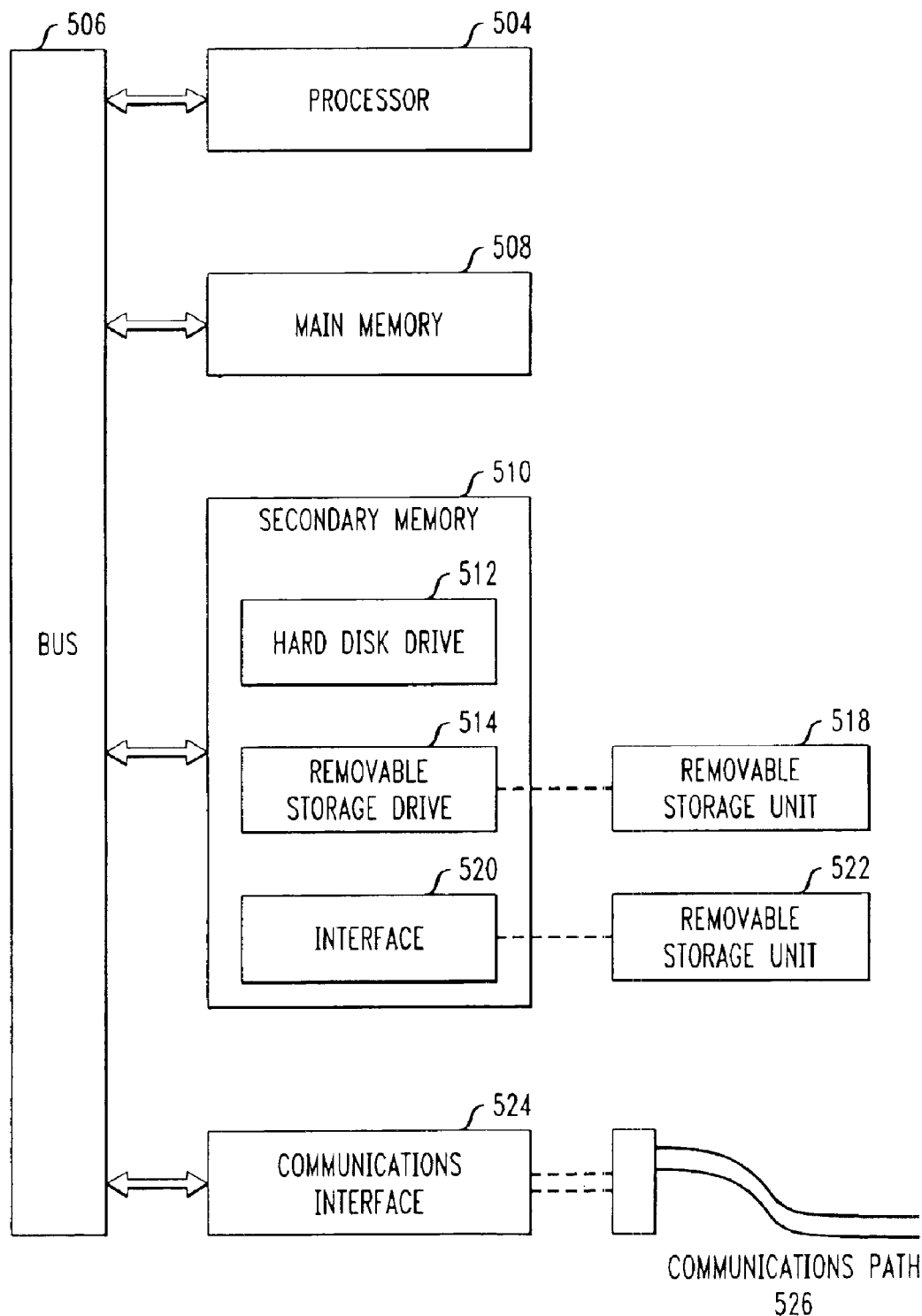
FIG. 5 depicts an example computer system in which the present invention can be implemented.

The present invention may be implemented using hardware, software or a combination thereof and may be implemented in a computer system or other processing system. In fact, in one embodiment, the invention is directed toward one or more computer systems capable of carrying out the functionality described herein. An example computer system 500 is shown in FIG. 5. The computer system 500 includes one or more processors, such as processor 504. The processor 504 is connected to a communication bus 506. Various software embodiments are described in terms of this example computer system. After reading this description, it will become apparent to a person skilled in the relevant art how to implement the invention using other computer systems and/or computer architectures.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples of such include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 518 to computer system 500.

Computer system 500 can also include a communications interface 524. Communications interface 524 allows software and data to be transferred between computer system 500 and external devices. Examples of communications interface 524 can include a modem, a network interface (such as an Ethernet card), a communications port, a PCM-CIA slot and card, etc. Software and data transferred via communications interface 524 are in the form of signals which can be electronic, electromagnetic, optical or other signals capable of being received by communications interface 524. These signals 526 are provided to communications interface 524 via a channel 528. This channel 528 carries signals 526 and can be implemented using wire or cable, fiber optics, a phone line, a cellular phone link, an RF link and other communications channels.

In this document, the terms "computer program medium" and "computer usable medium" are used to generally refer to media such as removable storage device 518, a hard disk installed in hard disk drive 512, and signals 526. These computer program products are means for providing software to computer system 500.

Computer programs (also called computer control logic) are stored in main memory 508 and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant arts that various changes in form and detail can be made without departing from the spirit and scope of the present invention. Thus the present invention should not be limited by any of the above-described exemplary embodiments, but should be defined only in accordance with the following claims and their equivalents. All cited patent documents and publications in the above description are incorporated herein by reference.

What is claimed is:

1. Apparatus for use in accordance with a key recovery system, the apparatus comprising:
   at least one processor operative to: (i) generate a key recovery block containing key recovery information for ciphertext encrypted using a cryptography key; (ii) determine a key recovery awareness status associated with a receiver for the ciphertext; and (iii) send the key recovery block to a key recovery client when the receiver is determined to be key recovery unaware.

2. The apparatus of claim 1, wherein the at least one processor is further operative to send the ciphertext to the receiver.

3. The apparatus of claim 2, wherein the ciphertext is sent to the receiver only after receiving confirmation from the key recovery client of the receipt of the key recovery block.

4. The apparatus of claim 1, wherein the at least one processor is further operative to encrypt data using the cryptography key to generate the ciphertext.

5. The apparatus of claim 1, wherein the at least one processor is further operative to send the key recovery block to the receiver when the receiver is determined to be one of key recovery aware and key recovery enabled.

6. The apparatus of claim 1, wherein the at least one processor is further operative to send a key recovery block in accordance with an Internet Control Message Protocol message.

7. A method for use in accordance with a key recovery system, the method comprising the steps of:
   generating a key recovery block containing key recovery information for ciphertext encrypted using a cryptography key;
   determining a key recovery awareness status associated with a receiver for the ciphertext; and
   sending the key recovery block to a key recovery client when the receiver is determined to be key recovery unaware.

8. The method of claim 7, further comprising the step of sending the ciphertext to the receiver.

9. The method of claim 8, wherein the ciphertext is sent to the receiver only after receiving confirmation from the key recovery client of the receipt of the key recovery block.

10. The method of claim 7, further comprising the step of encrypting data using the cryptography key to generate the ciphertext.

11. The method of claim 7, further comprising the step of sending the key recovery block to the receiver when the receiver is determined to be one of key recovery aware and key recovery enabled.

12. The method of claim 7, further comprising the step of sending a key recovery block in accordance with an Internet Control Message Protocol message.

13. A computer program product for use in accordance with a key recovery system, the computer program product comprising:
   a computer usable medium having computer readable program code means embodied in the medium, the computer readable program code means comprising:
   computer readable program code means for causing a computer to generate a key recovery block containing key recovery information for ciphertext encrypted using a cryptography key;
   computer readable program code means for causing a computer to determine a key recovery awareness status associated with a receiver for the ciphertext; and
   computer readable program code means for causing a computer to send the key recovery block to a key recovery client when the receiver is determined to be key recovery unaware.

14. The computer program product of claim 13, wherein the computer readable program code means further comprises computer readable program code means for causing a computer to send the ciphertext to the receiver.

15. The computer program product of claim 14, wherein the computer readable program code means for causing a computer to send the ciphertext to the receiver further comprises computer readable program code means for causing a computer to send the ciphertext to the receiver only after receiving confirmation from the key recovery client of the receipt of the key recovery block.

16. The computer program product of claim 13, wherein the computer readable program code means further comprises computer readable program code means for causing a computer to encrypt data using the cryptography key to generate the ciphertext.

17. The computer program product of claim 13, wherein the computer readable program code means further comprises computer readable program code means for causing a computer to send the key recovery block to the receiver when the receiver is determined to be one of key recovery aware and key recovery enabled.

18. The computer program product of claim 13, wherein the computer readable program code means further comprises computer readable program code means for causing a computer to send a key recovery block in accordance with an Internet Control Message Protocol message.

19. Apparatus for use in accordance with a key recovery system, the apparatus comprising:
   means for generating a key recovery block containing key recovery information for ciphertext encrypted using a cryptography key;
   means for determining a key recovery awareness status associated with a receiver for the ciphertext; and
   means for sending the key recovery block to a key recovery client when the receiver is determined to be key recovery unaware.

20. The apparatus of claim 19, further comprising means for sending the ciphertext to the receiver.

21. The apparatus of claim 20, wherein the ciphertext is sent to the receiver only after receiving confirmation from the key recovery client of the receipt of the key recovery block.

* * * * *